US010929780B2

(12) United States Patent
Behuria et al.

(10) Patent No.: US 10,929,780 B2
(45) Date of Patent: *Feb. 23, 2021

(54) ANALYTICS-BASED BIDIRECTIONAL DATABASE SYNCHRONIZATION

(71) Applicant: INTERNATIONAL BUSINESS MACHINES CORPORATION, Armonk, NY (US)

(72) Inventors: Ajay K Behuria, Bentonville, AR (US); James E. Bostick, Cedar Park, TX (US); John M. Ganci, Jr., Raleigh, NC (US); Souvik Majumdar, Kolkata (IN); Shuvamoy Saha, Bentonville, AR (US); David S Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,960

(22) Filed: May 24, 2019

(65) Prior Publication Data
US 2019/0303792 A1 Oct. 3, 2019

Related U.S. Application Data

(63) Continuation of application No. 14/082,548, filed on Nov. 18, 2013, now Pat. No. 10,402,744.

(51) Int. Cl.
  *G06N 20/00* (2019.01)
  *G06F 16/178* (2019.01)
  *G06F 16/27* (2019.01)
(52) U.S. Cl.
  CPC .......... *G06N 20/00* (2019.01); *G06F 16/178* (2019.01); *G06F 16/275* (2019.01)

(58) Field of Classification Search
  CPC ...... G06N 20/00; G06F 16/275; G06F 16/178
  See application file for complete search history.

(56) References Cited

U.S. PATENT DOCUMENTS

| 5,684,990 A | 11/1997 | Boothby |
| 7,302,446 B1 | 11/2007 | Boothby |
| (Continued) | | |

FOREIGN PATENT DOCUMENTS

WO 2005024626 A1 3/2005

OTHER PUBLICATIONS

Advisory Action (dated Jun. 14, 2018) for U.S. Appl. No. 14/082,548, filed Nov. 18, 2013; Confirmation No. 3371.
(Continued)

*Primary Examiner* — Miranda M Huang
*Assistant Examiner* — Kevin W Figueroa
(74) *Attorney, Agent, or Firm* — Schmeiser, Olsen & Watts; Michael A. Petrocelli

(57) ABSTRACT

A method and associated system for an automatically self-learning audit of a bidirectional synchronization means for synchronizing a source system and a target system. A processor identifies a mismatch between an element of production data of the source system and an analogous production-data element of the target system. If the mismatch is caused by an issue known to the synchronization means, the processor takes corrective action known to resolve the mismatch. Otherwise, the processor attempts to identify a resolution and, if successful, applies the resolution, teaches the resolution to the synchronization mechanism, records the solution, and resends data from the correct system to the incorrect system. If unable to identify a resolution, the processor implements a next-best solution that allows continued operation despite the unresolved mismatch. The processor then generates a report of the mis-
(Continued)

match and continues searching for other mismatches in the loaded data models.

20 Claims, 2 Drawing Sheets

(56) References Cited

U.S. PATENT DOCUMENTS

| | | | |
|---|---|---|---|
| 7,516,157 | B2 | 4/2009 | Cameron |
| 7,584,422 | B2 | 9/2009 | Ben-Yehuda |
| 7,672,957 | B2 | 3/2010 | Cotichini |
| 9,367,597 | B2 | 6/2016 | Behuria |
| 9,519,700 | B2 | 12/2016 | Behuria |
| 9,542,467 | B2 | 1/2017 | Behuria |
| 2006/0242278 | A1 | 10/2006 | Hawkins |
| 2007/0220062 | A1 | 9/2007 | Carberry |
| 2008/0098042 | A1 | 4/2008 | Tian |
| 2008/0162728 | A1 | 7/2008 | Robeal |
| 2009/0037492 | A1 | 2/2009 | Baitalmal |
| 2009/0037523 | A1 | 2/2009 | Kolke |
| 2009/0077002 | A1 | 3/2009 | Clark |
| 2009/0106224 | A1 | 4/2009 | Roulland |
| 2009/0164491 | A1 | 6/2009 | Cotichini |
| 2009/0222834 | A1 | 9/2009 | Gill |
| 2009/0259744 | A1 | 10/2009 | Kolke |
| 2009/0271653 | A1 | 10/2009 | Zhu |
| 2009/0287726 | A1 | 11/2009 | Verhoeven |
| 2010/0057759 | A1 | 3/2010 | Cotichini |
| 2010/0083221 | A1 | 4/2010 | Naik |
| 2010/0235321 | A1 | 9/2010 | Shukla |
| 2011/0055699 | A1 | 3/2011 | Li |
| 2011/0145187 | A1 | 6/2011 | Himmelsbach |
| 2011/0166849 | A1 | 7/2011 | Dube |
| 2011/0218964 | A1 | 9/2011 | Hagan |
| 2011/0276636 | A1 | 11/2011 | Cheng |
| 2012/0203862 | A1 | 8/2012 | Tayeb |
| 2012/0209989 | A1 | 8/2012 | Stewart |
| 2012/0240185 | A1 | 9/2012 | Kapoor |
| 2012/0265726 | A1 | 10/2012 | Padmanabhan |
| 2013/0152047 | A1 | 6/2013 | Moorthi |
| 2014/0149331 | A1 | 5/2014 | Iorio |
| 2015/0082100 | A1 | 3/2015 | Jain |
| 2015/0142719 | A1 | 5/2015 | Behuria |
| 2015/0142737 | A1 | 5/2015 | Behuria |
| 2015/0142740 | A1 | 5/2015 | Behuria |
| 2016/0253399 | A1 | 9/2016 | Behuria |

OTHER PUBLICATIONS

Advisory Action (dated Oct. 20, 2017) for U.S. Appl. No. 14/082,548, filed Nov. 18, 2013; Confirmation No. 3371.
Advisory Action (dated Nov. 25, 2016) for U.S. Appl. No. 14/082,548, filed Nov. 18, 2013; Confirmation No. 3371.
Amendment filed Jan. 28, 2016 in response to Office Action (dated Dec. 24, 2015) for U.S. Appl. No. 14/082,290, filed Nov. 18, 2013; Confirmation No. 9631.
Amendment filed Jan. 31, 2018 in response to Office Action (dated Dec. 22, 2017) for U.S. Appl. No. 14/082,548, filed Nov. 18, 2013; Confirmation No. 3371.
Amendment filed Mar. 24, 2017 in response to Office Action (dated Jan. 31, 2017) for U.S. Appl. No. 14/082,548, filed Nov. 18, 2013; Confirmation No. 3371.
Amendment filed Apr. 26, 2016 in response to Office Action (dated Apr. 20, 2016) for U.S. Appl. No. 14/082,548, filed Nov. 18, 2013; Confirmation No. 3371.
Amendment filed Aug. 24, 2016 in response to Office Action (dated Jul. 15, 2016) for U.S. Appl. No. 14/082,375, filed Nov. 18, 2013; Confirmation No. 4327.
Amendment filed Sep. 7, 2017 in response to Final Office Action (dated Jul. 11, 2017) for U.S. Appl. No. 14/082,548, filed Nov. 18, 2013; Confirmation No. 3371.
Amendment filed Oct. 26, 2016 in response to Final Office Action (dated Aug. 26, 2016) for U.S. Appl. No. 14/082,548, filed Nov. 18, 2013; Confirmation No. 3371.
Amendment filed Nov. 23, 2015 in response to Office Action (dated Sep. 3, 2015) for U.S. Appl. No. 14/082,548, filed Nov. 18, 2013; Confirmation No. 3371.
Amendment filed Dec. 20, 2018 in response to Office Action (dated Oct. 19, 2018) for U.S. Appl. No. 14/082,548, filed Nov. 18, 2013; Confirmation No. 3371.
Arsanjani et al., Web, Mar. 2003 Queue, Copyright 2003 ACM 1542-7730/03/0300, pp. 48-58.
Final Office Action (dated Mar. 22, 2018) for U.S. Appl. No. 14/082,548, filed Nov. 18, 2013; Confirmation No. 3371.
Final Office Action (dated Jul. 11, 2017) for U.S. Appl. No. 14/082,548, filed Nov. 18, 2013; Confirmation No. 3371.
Final Office Action (dated Aug. 26, 2016) for U.S. Appl. No. 14/082,548, filed Nov. 18, 2013; Confirmation No. 3371.
IBM, ip.com, Social Net Data Mining for Business Environments, Original Publication Date: Jul. 18, 2006, IP.com, No. IPCOM000138435D, 3 pages.
Instructor: Jamie Callan, Text Analytics: 95-865(A), Retrieved from internet on Dec. 15, 2015, http://boston.lti.cs.cmu.edu/classes/95-865/, 3 pages.
ip.com, Analyzing and Decomposing a Plurality of Rules, IP.com No. IPCOM000166751D, IP.com Electronic Publication: Jan. 21, 2008, Authors: Disclosed Anonymously, 38 pages.
ip.com, System and Method for Requirements and Capabilities Pairing via Self-Learning Analytical Engine, IP.com, No. IPCOM000226901D, IP.com Electronic Publication: Apr. 23, 2013, Authors: Disclosed Anonymously, 4 pages.
Kane et al., ip.com, A systolic Design Rule Checker, Publication Date Jul. 31, 1983, IP.com No. IPCOM000151824D, 30 pages.
Len Erlikh, Integration, Leveraging Legacy System Dollars for E-Business, 1520-9202/00/ copyright 2000 IEEE, May/Jun. 2000 IT Pro, pp. 17-23.
Notice of Allowance (dated Apr. 17, 2019) for U.S. Appl. No. 14/082,548, filed Nov. 18, 2013; Confirmation No. 3371.
Notice of Allowance (dated Aug. 17, 2016) for U.S. Appl. No. 15/148,355, filed May 6, 2016; Confirmation No. 4542.
Notice of Allowance (dated Sep. 12, 2016) for U.S. Appl. No. 14/082,375, filed Nov. 18, 2013; Confirmation No. 4327.
Notice of Allowance (dated Mar. 17, 2016) for U.S. Appl. No. 14/082,290, filed Nov. 18, 2013; Confirmation No. 9631.
Office Action (dated Jan. 31, 2017) for U.S. Appl. No. 14/082,548, filed Nov. 18, 2013; Confirmation No. 3371.
Office Action (dated Apr. 20, 2016) for U.S. Appl. No. 14/082,548, filed Nov. 18, 2013; Confirmation No. 3371.
Office Action (dated Jul. 15, 2016) for U.S. Appl. No. 14/082,375, filed Nov. 18, 2013; Confirmation No. 4327.
Office Action (dated Sep. 3, 2018) for U.S. Appl. No. 14/082,548, filed Nov. 18, 2013; Confirmation No. 3371.
Office Action (dated Oct. 19, 2018) for U.S. Appl. No. 14/082,548, filed Nov. 18, 2013; Confirmation No. 3371.
Office Action (dated Dec. 22, 2017) for U.S. Appl. No. 14/082,548, dated Nov. 18, 2013; Confirmation No. 3371.
Office Action (dated Dec. 24, 2015) for U.S. Appl. No. 14/082,290, filed Nov. 18, 2013; Confirmation No. 9631.
RCE and Amendment filed Jun. 4, 2018 in response to Final Office Action (dated Mar. 22, 2018) for U.S. Appl. No. 14/082,548, filed Nov. 18, 2013; Confirmation No. 3371.
RCE and Amendment filed Nov. 29, 2016 in response to Advisory Action (dated Nov. 25, 2016) for U.S. Appl. No. 14/082,548, filed Nov. 18, 2013; Confirmation No. 3371.
RCE filed Oct. 20, 2017 for U.S. Appl. No. 14/082,548, filed Nov. 18, 2013; Confirmation No. 3371.
Survey text mining with IBM SPSS Text Analytics for Surveys, Part 1: Exploring sample survey data, Jun. 3, 2014, Retrieved from internet on Dec. 15, 2015, http://www.ibm.com/developerworks/library/ba-spss-survey-text-mining1/, 29 pages.
Wyner et al., CS50AE: Information Extraction and Text Analytics, 21 pages.

ANALYTICS-BASED BIDIRECTIONAL DATABASE SYNCHRONIZATION

CROSS REFERENCE TO RELATED APPLICATIONS

This application is a continuation application claiming priority to Ser. No. 14/082,548 filed Nov. 18, 2013, now U.S. Pat. No. 10,402,744 issued Sep. 3, 2019, the contents of which are hereby incorporated by reference.

TECHNICAL FIELD

The present invention relates to automating the synchronization of two or more software applications, computer systems, or other electronic systems.

BACKGROUND

It may be necessary to synchronize the operation of two or more systems such that the two applications or systems perform equivalent functions, store identical or equivalent repositories of information, or produce equivalent output in response to equivalent input. In such cases, each system may comprise a combination of one or more software applications, computer systems, other computerized entities, other electronic entities, or one or more components of one or more communications infrastructures.

Such synchronization may be necessary, for example, when migrating users from a legacy software system to a new, more modern, software system, a process that may require both systems to be run concurrently, simultaneously, or in parallel. Synchronization may also be necessary in other situations, such as when comparing two or more computer platforms or when measuring relative efficiency of programs that perform similar functions by means different algorithms.

Synchronization may comprise functions like synchronizing data models that each represent a data structure of one of the systems, resolving inconsistencies in production data maintained by each system, or ensuring that, when fed identical or analogous input, a component of one system and an analogous component of an other system correctly produce identical, similar, or analogous output.

One means of synchronization is a mechanism in which a monitoring entity detects revisions to production data stored by one or more of the systems being synchronized or detects revisions to a data model that represents a data structure associated with one of the systems being synchronized. This monitoring entity may be a hardware or software component of one of the systems being synchronized or it may be a distinct intermediary hardware or software entity that monitors the systems being synchronized.

Such a monitoring entity may respond to a detection of a revision to a first system by making a corresponding change to one or more other systems in order to synchronize the operation of or the production data of the one or more other systems with the revised production data of the first system. The details of the corresponding change may be determined by one or more synchronization rules that tell the monitoring entity how to respond to a certain type of revision to the first system in order to resynchronize the one or more other systems to the revised first system. A synchronization rule may also describe how to translate a change to a data model or to production data of a first system into an analogous change to a data model or to production data of a second system. Such translations may not be trivial or obvious, especially when a data model of the first system differs in significant ways from a data model of the second system.

These synchronization rules may be difficult to maintain with accuracy. Components of each system may be added, removed, patched, or otherwise modified in different ways and at different times, and each modification may necessitate a revision to one or more synchronization procedures. If the rules are not promptly updated to accommodate these revised procedures, a rule may not identify a correct synchronization procedure when a monitoring entity identifies a need for synchronization. When synchronizing complex systems that comprise large numbers of rules, maintaining those rules may be complicated, vulnerable to error, and resource-intensive. There is thus a need for a way to automatically audit synchronization rules in order to ensure that the rules are accurately and promptly updated and that the rules continue to correctly synchronize the production data of the first and second systems.

BRIEF SUMMARY

A first embodiment of the present invention provides a method for method for auditing a bidirectional synchronization means, wherein the bidirectional synchronization maintains consistency between a source production data of a source system and a target production data of a target system, wherein the source production data comprises one or more source data elements, and wherein the target production data comprises one or more target data elements, the method comprising:

a processor of a computer system loading a first source element of the set of one or more source data elements and a first target element of the set of one or more target data elements;

the processor identifying a mismatch between the first source element and the first target element, wherein the mismatch creates an inconsistency between the source production data and the target production data;

the processor determining a corrective action as a function of the identifying;

the processor updating the bidirectional synchronization means as a function of the determining; and the processor recording the results of the identifying and of the resolving.

A second embodiment of the present invention provides a computer program product, comprising a computer-readable hardware storage device having a computer-readable program code stored therein, said program code configured to be executed by a processor of a computer system to implement a method for method for auditing a bidirectional synchronization means, wherein the bidirectional synchronization means maintains consistency between a source production data of a source system and a target production data of a target system, wherein the source production data comprises one or more source data elements, and wherein the target production data comprises one or more target data elements, the method comprising:

the processor loading a first source element of the set of one or more source data elements and a first target element of the set of one or more target data elements;

the processor identifying a mismatch between the first source element and the first target element, wherein the mismatch creates an inconsistency between the source production data and the target production data;

the processor determining a corrective action as a function of the identifying;

the processor updating the bidirectional synchronization means as a function of the determining; and the processor recording the results of the identifying and of the resolving.

A third embodiment of the present invention provides a computer system comprising a processor, a memory coupled to said processor, and a computer-readable hardware storage device coupled to said processor, said storage device containing program code configured to be run by said processor via the memory to implement a method for method for auditing a bidirectional synchronization means, wherein the bidirectional synchronization means maintains consistency between a source production data of a source system and a target production data of a target system, wherein the source production data comprises one or more source data elements, and wherein the target production data comprises one or more target data elements, the method comprising:

the processor loading a first source element of the set of one or more source data elements and a first target element of the set of one or more target data elements;

the processor identifying a mismatch between the first source element and the first target element, wherein the mismatch creates an inconsistency between the source production data and the target production data;

the processor determining a corrective action as a function of the identifying;

the processor updating the bidirectional synchronization means as a function of the determining; and the processor recording the results of the identifying and of the resolving.

DETAILED DESCRIPTION

Figure 1:
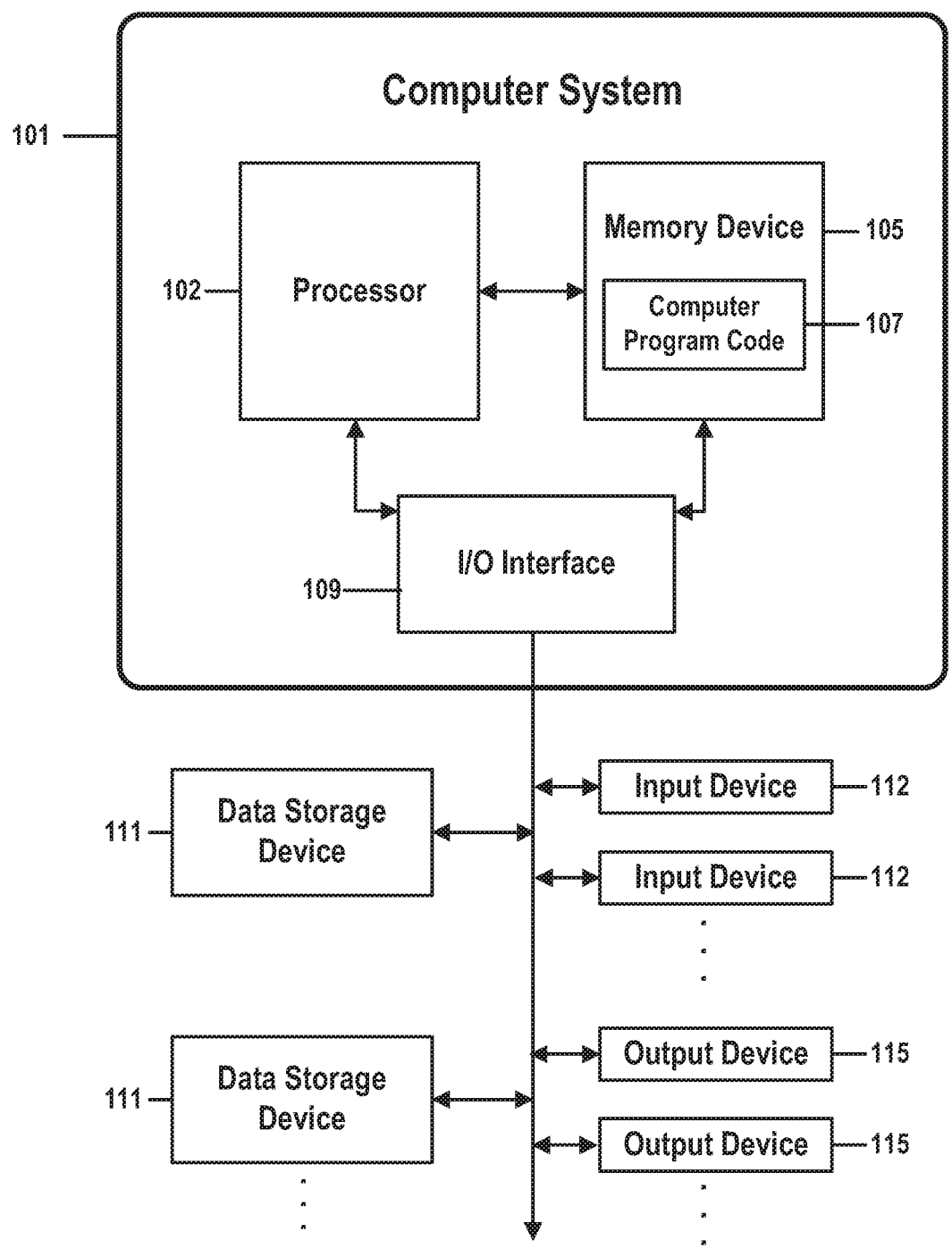
FIG. 1 shows the structure of a computer system and computer program code that may be used to implement a method for an automatically self-learning bidirectional synchronization of a source system and a target system in accordance with embodiments of the present invention.

Embodiments of the present invention automate the task of auditing and correcting synchronization rules that define procedures for keeping two or more systems synchronized. Each of these systems may comprise a combination of one or more software applications, computer systems, other computerized entities, other electronic entities, or one or more components of one or more communications infrastructures.

One way in which such systems may be synchronized is by means of automatically generated messages that instruct a monitoring intermediary entity to update data stored by a second, or "target" system in response to a change to data stored by a first, or "source" system.

In one example, if a user changes her account number in an account-tracking module of a source system, a message documenting that number-changing event may be sent to a target system, or to an third-party "intermediary" monitoring entity. This event message may be generated by the source system or by the target system by means known to those skilled in the art, may be generated by a component of the intermediary entity, or may be generated by a distinct monitoring or synchronization entity.

In this example, the event message may provide information that permits the target system or intermediary to then take steps to ensure that an account-tracking function of the target system is appropriately updated in response to the account-number change. The target-system module, or the account-number information that the module tracks, would thus be modified as though the user had changed her account number in the target system.

In a more specific example, consider a source system and a target system that both maintain a customer list. If a new customer named "John Smith" is added to the source system's customer list, a component of the source system, the target system, or an intermediary entity might then generate a message identifying this data-entry event. A synchronization mechanism would then identify and perform one or more rules instructing the target system to add customer "John Smith" to the target system's analogous customer list. Here, the specific, implementation-dependent, procedure required to keep the source and target systems synchronized would be identified, in response to the message, by the selection and performance of the one or more stored synchronization rules.

A message-based synchronization mechanism that keeps a pair of systems synchronized may be deemed "bidirectional" if messages may be sent in either direction, in response to revisions to either system. For example, if data of a first software application is revised, a synchronization mechanism may identify and perform a rule that instructs a second software application to perform steps necessary to synchronize its data with the first application's revised data. In this case, the first, revised, application would be considered a "source" system and the second, synchronized, application would be considered a "target" system.

If this synchronization mechanism is bidirectional, it would also be able to synchronize the first and second applications in the opposite direction, responding to a revision to data of the second system by identifying and performing a rule that instructs the first application to resynchronize the first application's data with the second application's revised data. Here, the "source" and "target" designations would be reversed, with the second application now acting as the rule's "source" system and the first application becoming the rule's "target."

A synchronization rule may describe how to synchronize a source system and a target system by performing one or more mapping functions and one or more transform functions. Consider, for example, a simple case in which a source data model represents an organization of production data of a source system and an identical target data model represents an identical organization of production data of a target system. If an element of source-system production data associated with a data element of the source data model undergoes revision, the two systems may be synchronized by performing an identical revision to an analogous element of target-system production data associated with an analogous data element of the target data model.

Here, the revision of the source production-data element would cause a message to be generated that described the initial revision event. This message might be received by a component of the source system, of the target system, or of an intermediary. The recipient would then analyze the received message and use the results of this analysis to select and perform (or "fire") one or more appropriate synchronization rules. In this example, that appropriate rule would describe a simple mapping function that duplicates the revision of the source data element on the analogous target data element. The firing of this rule would thus result in an instruction to the target system to duplicate the revision to the source-system's stored data in the target system's stored data.

In a more specific example, a synchronization rule may comprise a simple mapping function that requires a change to an instance of a "Customer" field in a source-system database to be duplicated by an identical change to an instance of an analogous "CustomerName" field in a target-system database. Revising an instance of the "Customer" field from "JSmith" to "JaneSmith" in the source database would thus result in revising an analogous instance of the "CustomerName" field from "JSmith" to "JaneSmith" in the target database.

In some implementations, a source data model may be very different from a corresponding target data model, and a synchronization rule may identify a complex function that comprises one or more algorithms represented in a programming language, script, or query language. In such cases, synchronizing a source and target may require a revision to a single source data element to be mapped all or in part to a differently formatted target element, to be mapped all or in part to multiple target data elements, to combined with other, unrevised, source or target data elements, to be combined with extrinsic information retrieved from an external information source, to be the subject of a conditional transformation as a function of a condition or characteristic of an other entity, or may comprise a combination of one or more other transforming functions. Such synchronization mechanisms may require a "transform" synchronization rule that identifies a complex transformation function, rather than a simple element-to-element mapping operation.

Consider, for example, an implementation in which a source system stores a customer name in two fields, "LastName" and "FirstName," and in which a target system stores a customer name as a single field "CustomerName." Here, a synchronizing mechanism may comprise a transform rule that synchronizes the source system and the target system by means of a multi-step transformation algorithm.

If a user changes the spelling of her first name in such a source system, the synchronization mechanism might respond to a message documenting this change by identifying and firing a transform rule that comprises: i) identifying and retrieving from the source system a "LastName" value that is associated with the user's changed "FirstName" value; ii) concatenating the changed "LastName" value with the retrieved "FirstName" value; and iii) storing the concatenated value as a revised instance of the "CustomerName" field in the target system.

Such a rule is an example of an "augmented" rule because it requires "augmenting" the user-modified "FirstName" value with a second, independently retrieved, "LastName" value. In general, an augmented rule is one that performs a synchronization function that requires more than one input data element.

Messages and rules may be created, maintained, and performed by a variety of means known to those skilled in the art. As described above, for example, an intermediary application may monitor source and target systems and generate an "event" message when it detects a revision to either system's production data, and a synchronization mechanism may identify and fire a synchronization rule in response to receiving the message. In some cases, a system designer may manually draft rules based on a manual analysis of source or target data models or may manually update a target system in response to an automatic generation of a synchronization message. Many other implementation strategies are possible.

Revisions to a data model of a source system or a target system may comprise restructuring or reorganizing data elements of the data model or may comprise an addition of, or a revision to, a condition upon how a component of the source data model is mapped or transformed into a format or structure that is compatible with the target data model. Because both source and target data models may undergo such updating on a continuous or ongoing basis, mapping and transformation rules may themselves need to be continuously or repeatedly revised in response to system revisions. These revisions may be performed manually, but such manual procedures may be prohibitively cumbersome and resource-intensive if a system undergoes frequent revision, comprises a large number of data models, data elements, program modules, or other components, or comprises coupled or related components such that a revision to a single component may affect other components.

In some cases, mapping and transformation rules may be performed or maintained by an intermediary application operating within an "enterprise service bus" (ESB) or "integration broker" architecture. In such an ESB architecture, based on conventions and standards known to those skilled in the art, the intermediary application may automatically generate simple mapping or transformation rules that may allow a source system and a target system to remain in synchronization.

But even within such an ESB architecture, the tasks of creating and maintaining rules that describe complicated, subtle, or frequently changing data mappings and transformations may be too complex to be performed by a simple data-mapping tool or too resource-intensive to be promptly performed every time a source or target module is revised.

Another hurdle is the fact that, when it is possible for a source system and a target system to produce inconsistent output or to otherwise lose synchronization with each other or with an external entity, it is essential to associate a "source of truth" with each transaction, data revision, data lookup, or other operation or function, wherein an entity deemed to be the source of truth is the entity that is most likely to produce or to have produced correct results.

If, for example, a source system and a target system produce inconsistent results in response to a revision to a customer list, a system administrator would be more likely to trust the result produced by the system that is considered to be the source of truth for the customer-list revision. If one system associates customer "JaneSmith" with account number "081301," but the other system associates that customer with account number "031301," then a system administrator would be more likely to trust the account number stored by the system that is considered to be the source of truth.

Those skilled in the art may identify a source of truth in a variety of ways, including, but not limited to, choosing the entity most recently updated, choosing the entity with access to the most recently updated database, or choosing the entity configured with the most robust error-correction mechanism.

When an intermediary entity operating within an ESB infrastructure uses procedures known to those skilled in the art to generate or maintain synchronization rules, the intermediary, or the set of rules that the intermediary generates, maintains, or performs, may itself become an additional candidate for each subsequent transaction's source of truth.

This may occur, for example, if the intermediary creates and stores rules as a design document that is distinct from the source system, the target system, and the data models and production data associated with the source and target systems. In such a case, the design document itself becomes a possible source of truth because, if the intermediary does not scrupulously update the design document every time a source data model or a target data model is revised, the rules in the document may produce incorrect or inconsistent results, even if the source system and target system themselves produce accurate results. In other words, methods known to those skilled in the art may store rules in a design document that must itself be synchronized with both the source and target system, thereby increasing, rather than decreasing, the cost of synchronization.

Embodiments of the present invention provide a different solution by means of an automatically created and updated set of data structures that store and cross-reference information about data models of a source system; data models of a target system; extrinsic data elements that may be retrieved from an external information source; and synchronization rules. In particular, embodiments of the present invention may comprise a set of data structures that respectively store: a set of mapping and transformation rules; a cross-reference between data elements of a source data model, or of production data of a source system, and the stored rules; a cross-reference between data elements of a target data model, or of production data of a target system, and the stored rules; and a cross-reference between external data elements and the stored rules.

In embodiments of the present invention, these data structures may be stored as combinations of flat files, worksheets, databases, knowledgebases, schemas or ontologies, other data structures, or other types of information repositories.

Embodiments of the present invention may efficiently and reliably manage mapping and transformation rules by reducing a need for redundant rule management. This is accomplished by means of the stored cross-reference that automatically identifies all synchronization rules that should be revised in response to a revision to a particular source data element of a source data model. Because this cross-reference allows all relevant rules to be identified with a single lookup, this mechanism eliminates the need to test every rule when a source data element is updated. If, for example, a length of a "CustomerName" character field of the source data model is extended from 30 characters to 36 characters, the cross-reference will allow a system designer or an automatic audit mechanism to quickly identify all synchronization rules that may be affected by this length change.

Similarly, when production data of the source system is updated, the cross-reference allows quick identification of all rules that must be fired in order to synchronize the target system to the updated source system. If, for example, an instance of "CustomerName" is updated from "JaneSmith" to "JayneSmith" in the source system's production database, the cross-reference will allow a system designer or an automatic audit mechanism to quickly identify all synchronization rules that should be fired in order to ensure that the production data maintained by the target system remains synchronized with the updated source system data. In another example, if a source system attempts to store a user-entered value of "CustomerName" as a 30-character field, but a target system has already stored a user-entered value of "CustomerName" as 32-character field, the cross-reference will allow a system designer or an automatic audit mechanism to quickly identify all synchronization rules that may be fired in order to determine which system should be considered the correct "source of truth."

If automated, such cross-reference lookup procedures eliminate the need for system administrators to manually identify, revise, or fire all rules that may directly or indirectly depend upon a particular value of production data, upon a particular a data element of a source data model, or upon a particular characteristic of an element of extrinsic information located at an external information source.

Consider, for example, a set of synchronization rules that comprise a subset of five rules that each respond in a different way when a user of a source system enters a transaction record into a source system. One rule might, for example, duplicate the transaction record in a Transaction table of the target system; a second rule might store the dollar amount of the transaction in the target system's Receivables table if the transaction record's "credit" attribute is set; and the third, fourth, and fifth records might perform other operations that depend upon the state of related variables.

If there is a change to a structure or format in which the transaction record is stored in the source data model, it might be necessary for an administrator to alter these five rules. In one example, a date field comprised by the transaction record might be revised from a two-digit format to a four-digit number, creating a mismatch between the way that transaction dates are stored in the source system and the way that transaction dates are stored in the target system. Such a mismatch might produce inconsistent results unless each of the five synchronization rules is revised to accommodate the revision. Many other types of mismatches are possible, as discussed below in the description of the method of FIG. 2.

In some cases, such a mismatch may be identified by analyzing differences in representations of the source and target data models. In other cases, such a mismatch may be inferred by comparing actual production data values stored by the source system and by the target system.

When faced with such a mismatch, an administrator might be forced to manually search all stored rules to locate the small subset of rules associated with the transaction record; to modify each rule of this subset; and to then further identify any other rules that might be indirectly affected by the modifications. When a system comprises large numbers of rules or when a source or target data model comprises large numbers of data elements, performing such tasks may become prohibitively complicated and prone to error. Furthermore, even when automated, such tasks may be so resource-intensive as to adversely affect system performance.

Embodiments of the present invention may automate these tasks with great efficiency by dramatically reducing the number of synchronization rules that must be analyzed in response to a source-system revision. Instead of having to load and analyze every stored rule, embodiments of the present invention would allow a system administrator to use the cross-reference to quickly identify the five rules that depend upon the source system's transaction record format, to modify them as needed to properly synchronize the source and target systems, to identify the most likely source of truth, and to resend any data required to synchronize the source and target systems.

Embodiments of the present invention may thus comprise an iterative process that continually or continuously compares components of the source data model to analogous components of the target data model, or that continually or continuously analyzes event messages to determine whether revision events described by the messages have forced the source and target systems out of synchronization.

When an embodiment discovers a mismatch between analogous source and target data elements or between analogous source and target production data, the embodiment uses the cross-reference to quickly identify all synchronization rules that depend upon the mismatched component in the source data model. It then attempts a series of corrective actions, based on characteristics of previously identified mismatches, to resolve the mismatch. If it determines that the mismatch is due to a previously unknown problem, it uses techniques of text-based analytics, semantics-based analytics, or an other analytic method to search for a new resolution. If it can't find a resolution, it attempts to perform a next-best alternative or workaround to the mismatch. The method then records the details of this analytical process so that, should the embodiment identify a similar mismatch in the future, it would be able to quickly identify and perform the best possible solution.

Figure 2:
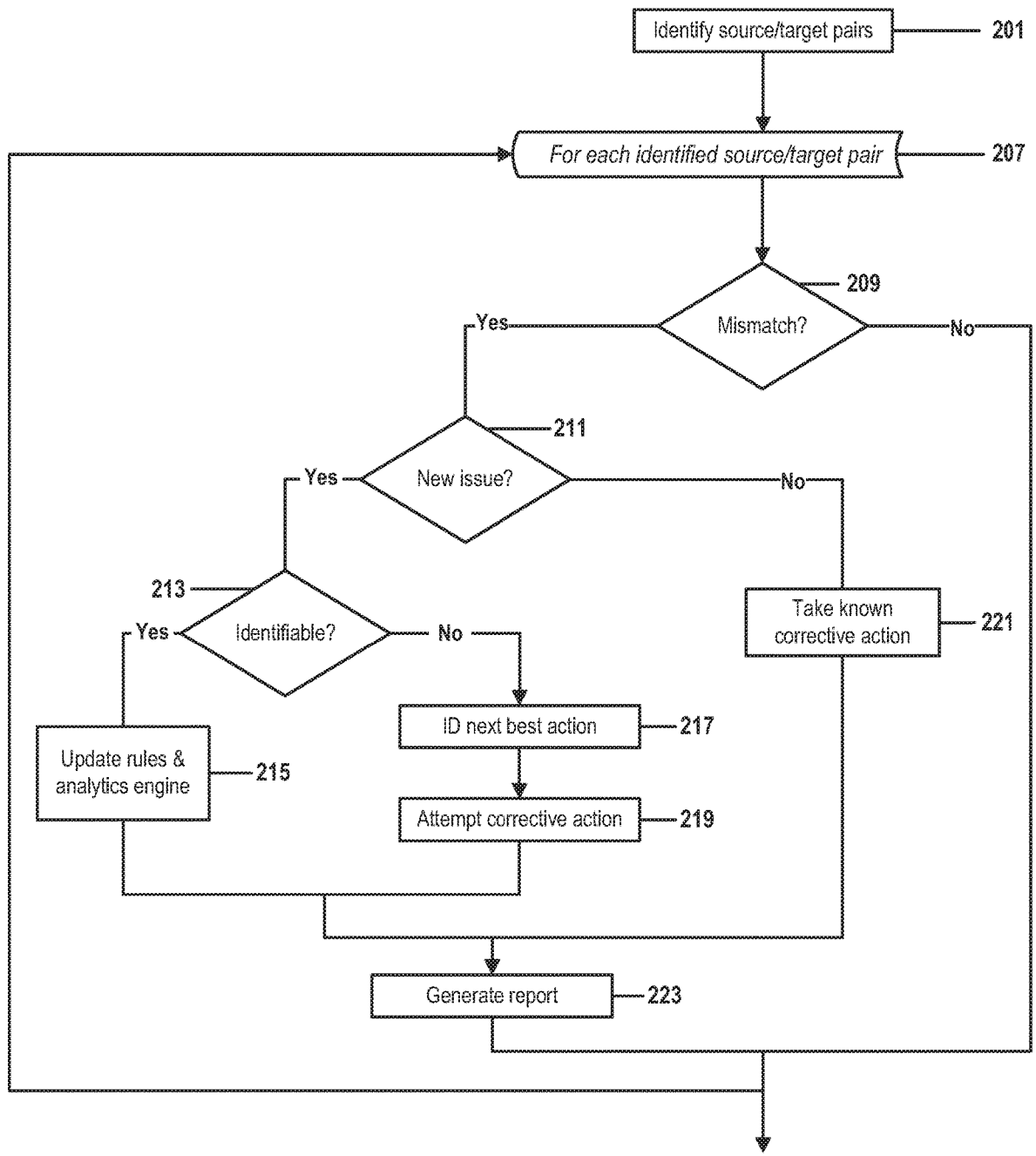
FIG. 2 is a flow chart that illustrates steps of a method for automatic self-learning sync audit in a bidirectional synchronization in accordance with embodiments of the present invention.

FIGS. 1-2 illustrate this process in greater detail.

FIG. 1 shows the structure of a computer system and computer program code that may be used to implement a method for an automatically self-learning bidirectional synchronization of a source system and a target system in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automatic self-learning sync audit in a bidirectional synchronization in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for automatic self-learning sync audit in a bidirectional synchronization.

Any of the components of the present invention could be created, integrated, hosted, maintained, deployed, managed, serviced, supported, etc. by a service provider who offers to facilitate a method for automatic self-learning sync audit in a bidirectional synchronization. Thus the present invention discloses a process for deploying or integrating computing infrastructure, comprising integrating computer-readable code into the computer system 101, wherein the code in combination with the computer system 101 is capable of performing a method for automatic self-learning sync audit in a bidirectional synchronization.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 is a flow chart that illustrates steps of a method for automatic self-learning sync audit in a bidirectional synchronization in accordance with embodiments of the present invention. FIG. 2 contains steps 201-223.

In step 201, embodiments of the present invention identify analogous pairs of data elements, wherein an analogous pair comprises one or more elements of data comprised by a source system and one or more elements of data comprised by a target system.

This identification may be performed by any combination of several types of implementation-dependent means. Some embodiments may, for example, load one or more sets of production data, wherein each set of loaded production data is associated with a source system of a set of one or more source systems or with a target system of a set of one or more target systems. As described above, a source system may take any of a variety of forms, such as a software application or enterprise computing system.

Each of these sets of production data may take any form known to those skilled in the art of data modeling, information technology, or related fields. Such a form may comprise, but is not limited to, a combination of one or more databases, flat files, knowledgebases, schemas, subschemas, ontologies, scripts, source code listings, pseudocode, reference documents, or other structured or unstructured information repositories.

The form and content of a set of production data must make it possible for the embodiment in this step to identify a logical element of the source system that could be an input field, an output field, or an other data element of a synchronization rule, wherein a synchronization rule may be used by a synchronization mechanism, as described above, to synchronize the source system's production data with the production data of the target system. Such an identified logical element may further correspond to a logical element of a data model that represents a data organization of a component of the source or target system.

In such embodiments, the synchronization rule may associate the identified logical element or element of stored data of the source system with one or more logical elements or elements of stored data of the target system, and this association may make it possible to relate an element of stored data of a source system to an element of stored data of a target system.

In one example, consider a set of source-system production data that comprises a set of records, each of which consists of a three-digit customer number and a ten-character customer name that correspond to fields of a source data model named "CustomerNumber" and "CustomerName." If a synchronization rule contains a mapping instruction that maps the source-system's three-digit "CustomerNumber" field onto a six-digit "CustNumber" field in the target system, then performing step 201 would identify a pair of analogous data elements that comprises each instance of the "CustomerNumber" field of the source system with an analogous instance of the "CustNumber" field of the target system. If the source-system production data comprises ten such customer records, the procedure of step 201 would identify ten pairs of data elements.

In other embodiments, the identification of some or all analogous pairs may be performed through different or additional means, which may include a combination of manual and automated mechanisms.

An embodiment of the present invention that loads sets of source and target production data must thus, in step 201, infer from these loaded sets of data, a set of pairs of analogous source and target data elements.

Rather than loading entire sets of production data, some embodiments of the present invention may in step 201 instead identify analogous pairs of data by considering only elements of data that have been revised during a certain period of time or that are associated with an other type of reported event occurring during a certain period of time. These events may be identified through any means known to those skilled in the art, such as reviewing an event log. In some cases, the two methods may be combined, such that one or more steps of considering only time-limited events are performed between steps of loading entire sets of production data.

In some embodiments of the present invention, this step may be performed periodically, at set intervals, at times identified by the occurrence or nonoccurrence of a condition, such attaining a performance or resource-consumption threshold. Such embodiments may consider only those events that have occurred since the last performance of step 201.

In some cases, the method of FIG. 2 may be performed continuously, with step 201 being performed at the completion of the iterative process of steps 207-223.

In other embodiments, step 201 may be performed in response to the generation of an event message that identifies a revision to an element of production data or that identifies some other event. In such cases, the method of FIG. 2 may be a real-time or near-real-time procedure that monitors changes to a set of production data and automatically identifies and resolves synchronization problems, learning from each resolution how to more intelligently and efficiently solve similar problems in the future.

Embodiments that identify analogous pairs in step 201 by analyzing logged events or generated event messages may do so because such events and messages identify both a changed element of production data and a logical data element of a data model that represents, is associated with, or identifies the changed production data.

In one example, if a user changes her account number from "301-00" to "601-00," a synchronization mechanism may respond by generating an event message that documents a change of a stored "CustomerNumber" data field from "301-00" to "601-00." An embodiment of the present invention that intercepts or otherwise receives this message would identify that production data corresponding to logical data element "CustomerNumber" has been revised. It would then use this information to identify synchronization rules that synchronize the target system's production data when there is a change to source system production data represented by the logical element "CustomerNumber."

Here, such a rule might comprise a function of appending a prefix "A-" to the stored "CustomerNumber" value and then saving the appended value in the target system's "RevisedNumber" field. Here, "CustomerNumber" is a logical element identified by the source system's data model and "RevisedNumber" is a logical element identified by the target system's data model. The two elements are related by the synchronization rule and the synchronization rule is identified by the event message.

In this example, the embodiment of the present invention would determine, based on the information in the event message and in the synchronization rule, that an analogous record of the target system must contain an instance of the "RevisedNumber" field that is a function of the revised source system's "CustomerNumber" value. It would thus identify "CustomerNumber" and "RevisedNumber" as an analogous pair and would, in step 209, determine whether the data actually stored in the target system matches the value called for by the synchronization rule.

In some embodiments, a message or event may identify both an element of production data and a logical element of a data model that is associated with the element of production data. In such cases, an embodiment may identify and associate a data-altering event and a logical data element by analyzing information comprised by the message or event, and this step of analyzing may in part comprise one or more techniques known to those skilled in the art.

A message, for example, may describe an event that comprises a user setting up a new account in a source system by filling in a form that assigns her account a six-digit account number and stores that six-digit number as an instance of a source data model field named "CustomerAcct." Such a message might allow an embodiment to determine that the event affects source data-model element "CustomerAcct" and that synchronizing the target system's production data in response to the event may require the identification and performance of synchronization rules associated with source element "CustomerAcct."

In some embodiments, a procedure of step 201 may further infer or identify an "augmented" association between a logical element of the target system and more than one other elements, where the more than one other elements may be a combination of instances of logical elements of the source system and of elements of information that may be retrieved from external sources. This further inference may be performed by analyzing information represented by production data, a data model, or a synchronization rule.

In one example, if a synchronization rule relates a record of source production data represented by a source-system data model:

| CustNumber | LastName | FirstName |
|---|---|---| to an analogous record of target production data represented by a target-system data model:

| CustNumber | LastName | FirstName | CustFullName = FirstName | LastName |
|---|---|---|---|---| then an embodiment of the present invention might in step 201 infer an association between an instance of the field "LastName" in the source production data with an instance of a similarly named field LastName in the target system, and to further associate the instance of the target field "CustFullName" with a concatenated value of instances of the fields "LastName" and "FirstName" in the source database.

In the above example, the relationship between the instance of the CustFullName" field of the target database and instances of the "FirstName" and "LastName" fields of the source database is an example of an augmented-data relationship. Here, if a "LastName" value is revised in the source system, a synchronization rule may be able to synchronize a corresponding "CustFullName" value in the target database, only by first augmenting the associated "LastName" value by retrieving a corresponding "FirstName" value.

Many other methods of identifying a pair of analogous source and target elements of data are possible, using information stored in the source and target data models, the source and target production data, the synchronization rules, and external information sources. In embodiments of the present invention described here in FIG. 2, we describe one broad class of embodiments, in which identifying is performed by means of analyzing information stored in event messages, optionally in light of information stored in data models and synchronization rules. But this description should not be construed to limit the scope of the present invention to this single class of embodiments.

Step 207 initiates an iterative process of steps 207-223 that is repeated for each possible pair or set of identical, similar, analogous, or otherwise related elements of data identified in step 201, wherein the identified pair or set includes one element of data of a source system and one associated element of data of a target system.

This iterative process of steps 207-223 repeats once for each combination of analogous pairs identified in step 201. At the conclusion of the last iteration of this iterative process, the method of FIG. 2 ends. In some embodiments, the method of FIG. 2 would then restart with step 201 and continue to run repeatedly, thus continuously monitoring the source and target systems and their associated synchronization system and synchronization rules.

In some embodiments, the procedure of steps 207-223 may be performed when a message is generated by a synchronization mechanism or when an event is identified by a synchronization mechanism. Such a message or event may be associated with an update to a data model of the source system or target system or to an element of production data of either the source system or the target system.

In step 209, embodiments of the present invention compare the analogous pair of source and target data elements being processed by the current iteration of the iterative loop of steps 207-223. If performance of step 209 identifies a mismatch between the compared source element and the compared target element, a procedure of steps 211-223 is performed. If no mismatch is found, the next iteration of steps 207-223 begins in order to compare the next pair of source and target elements identified in step 201.

A mismatch may comprise any sort of inconsistency or condition that would create an error, be associated with inconsistent results, be associated with an inconsistency between the source and target production data, be associated with an inconsistency between the source and target production data models, or necessitate a modification to a synchronization rule in order for the synchronization mechanism to function properly. Such a mismatch may comprise, but is not limited to, conditions such as: a missing element of source production data or target production data; an erroneous duplication of a source or target element; a source element storage format or structure that is inconsistent with a storage format or structure of the target element; and a logical or other relationship between the source element and an other element, where the logical or other relationship is inconsistent with a similar or analogous logical or other relationship between the target element and an other element.

A mismatch might occur, for example, if the procedure of step 209 reveals that, although a user-entered instance of a "FirstName" field exists in a source-system database, an analogous instance of a "FirstName" field has been deleted from an equivalent target-system database. In another example, a mismatch might be identified if an instance of a "CustomerNumber" field has been successfully entered into the source production data a 9-character alphanumeric string, but the equivalent customer number has been stored in the target data model as a 4-byte integer number. In yet another example, a mismatch might exist if customer accounts are stored as records of a source-system database file and are indexed by an "AccountNumber" primary key, but analogous records in the target system are stored as database records indexed by a "CustomerName" primary key.

In some embodiments, a mismatch may be further identified by information culled from an event message in step 201. A message might, for example, report an event that comprises a user entering an instance of logical element "CustomerName" into the source system, where the entered instance comprises a string "JeremiahAnthonySmith" stored as a 20-character text field. Here, identifying a mismatch in step 209 might comprise identifying a function of a synchronization rule that process instances of the "CustomerName" field. If one such rule, for example, describes a synchronization function that copies an entered instance of the source system's 20-character "CustomerName" field into an analogous 24-character "NewCustName" field in the target system, by padding the copied data with four trailing <0> null characters, the embodiment may then determine whether a mismatch exists by determining whether the analogous target-system production data comprises a 24-bit string "JeremiahAnthonySmith<0><0><0><0>."

Many other types of mismatches are possible, and a type of mismatch may depend upon conditions that are a function of a combination of technical, system, platform, business, performance, cost, or other design considerations. Based on the results of these and other types of techniques, novel or known to those skilled in the art, of identifying a mismatch, the method of FIG. 2 may in step 209, identify a mismatch between the pair of analogous source and target data elements. If such a mismatch is found to exist, the procedure of steps 211-223 is performed in order to attempt to analyze and resolve the mismatch.

In case of such a mismatch, the procedure of steps 211-223 may further identify whether the source system or the target system should be considered the source of truth for an event that triggered or that is otherwise associated with this iteration of the procedure of steps 207-223. If necessary, a corrective action performed by this procedure may include an auto-resend of the event information from the source-of-truth system to the other system. In this way, embodiments of the present invention may implement a self-healing function that automatically resolves a mismatch in a manner most likely to produce consistent and accurate results.

Step 211 is performed if step 209 identifies a mismatch between the current pair of source and target elements of data stored, respectively, in the source and target production databases. In step 211, the method of FIG. 2 determines whether the mismatch is associated with a new, previously unknown or unresolved, issue. If so, the method continues with steps 213-219 in order to attempt to identify the issue, derive a resolution, and update the synchronization mechanism to recognize the issue the next time this issue causes a mismatch. Otherwise, if the procedure of step 211 identifies the mismatch as having been caused by a known or previously resolved issue, the method of FIG. 2 continues with step 221, where the embodiment applies corrective action learned during a previous iteration of this procedure.

The determining of step 211 may be performed by means of tools or techniques known to those skilled in the art, such as a database query or flat-file lookup. Regardless of the known or novel tools or techniques used by the determining, the determining comprises a procedure of searching in a repository of known resolutions for a known identification of and a known resolution to a similar or analogous mismatch. Such a repository of known resolutions may be implemented as a flat file, as a database, as a knowledgebase, or in some other type of structured or unstructured information repository.

In one example, a mismatch may be detected in step 209 between a four-digit integer stored as an instance of a "TransactionYear" field of the source system's production data, and an analogous two-digit integer variable stored an analogous target system production data represented by an instance of a "XactnYr" field of a target data model. In step 211, an embodiment might then search for previously successful resolutions to this type of problem in a database repository of known resolutions. Through querying techniques known to those skilled in the art of database management, the embodiment might identify a type of corrective action that had been used successfully in the past to resolve similar mismatches between two-digit "year" date variables and four-digit "year" date variables. The method of FIG. 2 would then proceed in step 221 to resolve the mismatch by means of this identified corrective action.

In this example, if no identification of a previous mismatch cause and resolution are found in step 211, the method of FIG. 2 would then instead continue trying to identify and resolve the mismatch by performing steps 213-219.

Step 213 is performed if the procedure of step 211 determines that the mismatch identified in step 209 is associated with a previously unknown cause and that no known resolution for the mismatch can be found in the repository of known resolutions.

In such cases, embodiments of FIG. 2 attempt to use analytic procedures in order to identify a cause for the mismatch. In some embodiments, these procedures might comprise applying techniques of text-based analytics or semantics-based analytics to the source or target data models or to the source or target production data in order to infer and associate intent, meaning, or relationships among elements of the data models or between the pair of data elements comprised by the analogous pair identified in step 207. Other embodiments may perform this task by means of procedures that comprise other methods of analytics, statistics, analysis, artificial intelligence, or other information-revealing technologies known to those skilled in the art.

In our previous example, if the method of step 211 fails to identify a known cause of or resolution to the "year" date mismatch described above, step 213 may use a method of text-based analytics to characterize the mismatch, to infer meaning to the two instances of production data or to the "XactnYr" and "TransactionYear" logical elements, or to otherwise identify a resolution to the mismatch.

If the procedure of step 213 successfully identifies the cause of the mismatch and identifies a resolution to the mismatch, the method of FIG. 2 proceeds with step 215 in order to resolve the mismatch and to teach the synchronization system how to resolve similar mismatches in the future. Otherwise, the embodiment continues with steps 217-219.

Step 215 is performed if the procedure of step 213 successfully identifies a resolution to the mismatch identified in step 209. In such a case, the procedure of step 215 then takes corrective action by identifying and updating synchronization rules specified by the resolution identified in step 213. In some embodiments, this identifying may comprise identifying all synchronization rules that process information associated with a logical data element associated with either of the analogous pair identified in step 207. In some embodiments, this identifying may be performed automatically and in an efficient manner by means of one or more cross-references that may identify synchronization rules associated with a particular logical data element of a source or target data model.

In some embodiments this corrective action may further comprise identifying a source of truth that identifies whether the source system or the target system is more likely to be most consistent with its data model, is more likely to produce or store accurate data, is more likely to be consistent with external data sources, applications, or systems, or is more likely to be currently or properly updated. In some embodiments, this corrective action may comprise automatically triggering the resending of data from a system identified to be a source of truth to a system not so identified. This resending may be in response to an identification, by means of an event message, of an event log, or of a function of step 201, that data had previously been sent from a less-reliable system to a more-reliable system, or this resending may be in response to an identification of a more reliable characterization of a mismatch, of a cause of a mismatch, or of a resolution to a mismatch as a result of the analysis of the current iteration of the procedure of steps 209-223.

The procedure of step 215 may further update an associated analytics engine, one or more associated synchronization rules, and the repository of known solutions to record the successful identification and resolution of the mismatch issue in step 213 and to further record inferences that may have been made during the identification procedure of step 213. This further recording may increase the efficiency and accuracy of future analytics tasks undertaken to identify and correct the causes of other mismatches.

Continuing the previous example, if the procedure of step 213 had applied methods of text-based analytics to determine that the mismatch identified in step 209 occurred because a "TransactionYear" variable in the target data model stores only the last two digits of a date year, while an analogous "TransactionYear" variable in the source data model stores all four years, the corrective action of step 215 might comprise: i) identifying all synchronization rules that synchronize instances of the source system's and target system's analogous "TransactionYear" variables or that otherwise process an instance of the source system's "TransactionYear" variable; and ii) revising those rules to properly truncate values of the source system's "TransactionYear" data before attempting to store it as an instance of the target system's analogous "TransactionYear" variable.

Some embodiments may add a further feedback or learning mechanism to step 215 by further analyzing the cause of the mismatch identified in step 213 within the context of known resolutions already described or listed in the repository of known resolutions, in order to attempt to further identify patterns or sequences of steps that might allow the analytics engine to better identify, classify, or resolve future mismatches. In such embodiments, the analytics engine, synchronization rules, and repository of known resolutions may be further updated in step 215 in response to the results of such an analysis. In some embodiments, this type of automated pattern-matching, further updating, feedback, or learning mechanism may occur at one or more other steps within the sequence of steps of the method of the present invention.

As with all corrective-action steps listed in FIG. 2, the corrective action identified in step 215 may comprise identifying which system is the source of truth for an associated event and automatically resending, revising, or restoring event data or synchronization data in order to ensure that all systems are synchronized to the presumably correct state of the source-of-truth system, rather than being synchronized to a system that is not the source of truth.

Step 217 is performed if the procedure of step 213 fails to successfully identify a resolution to the mismatch identified in step 209. Step 217 uses techniques that may be either novel or known to those skilled in the art to attempt to identify a "next best action," wherein a "next best action" may be an alternative corrective action, reporting procedure, or workaround that may yield a reasonably accurate, consistent, efficient, or otherwise desirable result when it is not possible to resolve the mismatch.

Identification of a "next best action" may be a function of a technology, platform, cost, software or hardware design, business goal, or other implementation-dependent parameter. In one example, a "next best action" may comprise communicating an alert to a database administrator, information-technology specialist, or system administrator. Many other "next best actions" are possible, and may comprise, but are not limited to, combinations of: warning users that a certain system function may be out of date or unavailable; scheduling a software or hardware update; performing a diagnostic or prognostic operation; performing a synchronization function; and scheduling a further analysis of the mismatch after examining other mismatches between the source and target data models read in step 201.

In some cases, if a "next best action" cannot be identified in step 217, a worst-case "next best action" may be selected by default, where the worst-case action might comprise halting the operation of the source or target system, or notifying a responsible party that immediate, manual action is required.

In step 219, an embodiment performs the corrective action associated with the "next best action" identified in step 217.

As noted in the description of step 215, this corrective action may comprise identifying a source of truth that identifies whether the source system or the target system is more likely to be most consistent with its data model, is more likely to produce or store accurate data, is more likely to be consistent with external data sources, applications, or systems, or is more likely to be fully updated. In some embodiments, this corrective action may comprise automatically triggering the resending of data from a system identified to be a source of truth to a system not so identified. This resending may be in response to an identification that data had previously been sent from a less-reliable system to a more-reliable system, or may be in response to an identification of a more reliable characterization of a mismatch, a cause of a mismatch, or a resolution to a mismatch as a result of the analysis of the current iteration of the procedure of steps 209-223.

Step 221 is performed if the procedure of step 211 determines that the mismatch identified in step 209 is associated with a previously known cause that has been resolved in the past by a known resolution, and where characteristics of this previously known cause or known resolution are stored in the repository of known resolutions.

In such a case, embodiments then take the known corrective action identified by the procedure of step 211. As described above, this corrective action may comprise automatically identifying and updating synchronization rules specified by the known resolution identified in step 211 as being stored in the repository of known resolutions.

As described above, this corrective action may further comprise identifying a source of truth that identifies whether the source system or the target system is more likely to be most consistent with its data model, is more likely to produce or store accurate data, is more likely to be consistent with external data sources, applications, or systems, or is more likely to be fully updated. In some embodiments, this corrective action may comprise automatically triggering the resending of data from a system identified to be a source of truth to a system not so identified. This resending may be in response to an identification that data had previously been sent from a less-reliable system to a more-reliable system, or may be in response to an identification of a more reliable characterization of a mismatch, a cause of a mismatch, or a resolution to a mismatch as a result of the analysis of the current iteration of the procedure of steps 209-223.

In step 223, embodiments of the present invention report and record the result of the current iteration of the iterative process of steps 207-223. Some embodiments may perform this step even when the iteration has not identified a mismatch in step 209.

The reporting and recording may comprise producing reports or logs that notify system administrators, maintenance personnel, system designers, database administrators, monitoring or intermediary applications, or other responsible parties or automated systems that a mismatch has been found that represents an inconsistency between the source and target systems. The reporting and recording may further comprise producing similar reports or logs that detail the outcome of the detection of the mismatch, such as an identification or analysis of the cause of the mismatch, attempts made to resolve the mismatch or to identify and implement a "next best action," the outcomes of such attempts, or a characterization of a previously unknown type of mismatch or a previously unknown cause of a mismatch has been detected.

In some embodiments a report or log may be produced as a hardcopy printout, as a message distributed through a network to a mobile device or other personal receiving means, or may be displayed by a "dashboard" real-time or interactive reporting application or system.

In some embodiments a report or log may be produced or distributed only when the procedure of steps 211-221 is unable to resolve a mismatch. In some embodiments a report or log may be produced or distributed only when the procedure of steps 211-221 is able to neither resolve a mismatch nor identify a "next best action." In some embodiments a report or log may be produced or distributed only when the procedure of steps 211-221 is able to neither resolve a mismatch nor successfully complete a "next best action."

If a previously unknown type of corrective action has been found to resolve a mismatch in step 213, this characterization of and resolution and to the mismatch may be stored in the repository of known resolutions. In this way, when a future iteration of the iterative procedure of steps 207-223 detects a similar type of mismatch, the embodiment will not have to repeat the analytic procedure of steps 213-219, and may instead merely perform corrective actions known to have previously been effective. This procedure may provide an auto-learning and self-healing feature to embodiments of the present invention, wherein a procedure of auditing a synchronization mechanism automatically learns from actions it takes to analyze and resolve each inconsistency or error condition it identifies.

The iterative process of steps 207-223 continues until an iteration has been performed for each possible pairing of source and target data elements identified in step 201. At the completion of the last such iteration, the procedure of FIG. 2 ends.

In some embodiments, the method of FIG. 2 may be implemented as an ongoing, self-correcting process that continuously monitors, audits, and automatically corrects the integrity of the synchronization rules that maintain consistency between the source system and target system. In such cases, when the final iteration of the procedure of steps 207-223 completes, the method of FIG. 2 restarts by loading the latest versions of the source and target data models in step 201, or by loading a log of information comprised by event messages generated since the last performance of step 201.

In some embodiments, the method of FIG. 2 may be implemented as a scheduled activity that is performed at specified times or at specified intervals.

What is claimed is:

1. A method for automatically updating synchronization rules of a bidirectional database-synchronization system, the method comprising:

a processor of a computer system loading a first source element of source production data comprised by a source database-management system and a first target element of target production data comprised by a target database-management system, where the source database-management system stores data in a first format that is distinct from a second format in which the target database-management system stores data, where the first source element and the first target element represents a same element of information;

the processor identifying a mismatch between the first source element and the first target element, where the mismatch creates an inconsistency between the source production data and the target production data, and where the mismatch has occurred because a user has performed a transaction that has altered the first source element and the first target element in an inconsistent manner;

the processor determining, using text-based cognitive analytics performed by a first artificially intelligent analytics engine, that the mismatch is of a certain type of a plurality of types of mismatches, where the certain type has not previously been corrected by any previously known corrective action;

the processor attempting to further determine, using semantic analytics performed by a second artificially intelligent analytics engine, a new corrective action, where the semantic analytics predicts that the new corrective action corrects mismatches of the certain type; and the processor updating the bidirectional database-synchronization system as a function of the determining, such that the bidirectional database-synchronization system becomes capable of identifying and correcting future mismatches of the certain type.

2. The method of claim 1, where the processor performs the loading in response to a user's revision of the first source element.

3. The method of claim 1, where the recording further comprises:

recording the results of the identifying and the attempting in a repository of known resolutions.

4. The method of claim 1, where the attempting further comprises:

the processor identifying a new corrective action that does resolve the mismatch.

5. The method of claim 4, where the recording further comprises:

the processor recognizing, as a function of additional text-based analytics performed by the analytics engine, a pattern comprised by the cause of the mismatch;

the processor revising the analytics engine as a function of the pattern; and the processor recording the results of the identifying, the determining, the attempting, and the updating in the repository of known resolutions.

6. The method of claim 1, where:

the bidirectional database-synchronization system comprises a synchronization rule of a set of bidirectional synchronization rules, where the synchronization rule describes a method of resolving the mismatch, where the synchronization rule comprises a reference to the first source element; and where the new corrective action comprises changing the synchronization rule as a function of a procedure described by the synchronization rule.

7. The method of claim 6, where:

the synchronization rule further comprises a reference to a second source element of the source production data; and the new corrective action further comprises automatically loading the second source element as a function of the procedure described by the synchronization rule.

8. The method of claim 6, where the new corrective action further comprises identifying the synchronization rule as a function of the first source element by means of a cross-reference that associates each rule of the set of bidirectional synchronization rules with at least one source element of the source production data.

9. The method of claim 1, further comprising providing at least one support service for at least one of creating, integrating, hosting, maintaining, and deploying computer-readable program code in the computer system, where the computer-readable program code in combination with the computer system is configured to implement the loading, the identifying, the determining, the attempting, and the updating.

10. A computer program product, comprising a computer-readable hardware storage device having a computer-readable program code stored therein, said program code configured to be executed by a processor of a computer system to implement a method for automatically updating synchronization rules of a bidirectional database-synchronization system, the method comprising:

the processor loading a first source element of source production data comprised by a source database-management system and a first target element of target production data comprised by a target database-management system, where the source database-management system stores data in a first format that is distinct from a second format in which the target database-management system stores data, where the first source element and the first target element represent a same element of information;

the processor identifying a mismatch between the first source element and the first target element, where the mismatch creates an inconsistency between the source production data and the target production data, and where the mismatch has occurred because a user has performed a transaction that has altered the first source element and the first target element in an inconsistent manner;

the processor determining, using text-based cognitive analytics performed by a first artificially intelligent analytics engine, that the mismatch is of a certain type of a plurality of types of mismatches, where the certain type has not previously been corrected by any previously known corrective action;

the processor attempting to further determine, using semantic analytics performed by a second artificially intelligent analytics engine, a new corrective action, where the semantic analytics predicts that the new corrective action corrects mismatches of the certain type; and the processor updating the bidirectional database-synchronization system as a function of the determining, such that the bidirectional database-synchronization system becomes capable of identifying and correcting future mismatches of the certain type.

11. The computer program product of claim 10, where the processor performs the loading in response to a user's revision of the first source element.

12. The computer program product of claim 10, where the recording further comprises:

recording the results of the identifying and the attempting in a repository of known resolutions.

13. The computer program product of claim 10, where the attempting further comprises:

the processor identifying a new corrective action that does resolve the mismatch.

14. The computer program product of claim 13, where the recording further comprises:

the processor recognizing, as a function of additional text-based analytics performed by the analytics engine, a pattern comprised by the cause of the mismatch;

the processor revising the analytics engine as a function of the pattern; and the processor recording the results of the identifying, the determining, the attempting, and the updating in the repository of known resolutions.

15. The computer program product of claim 10, where:

the bidirectional database-synchronization system comprises a synchronization rule of a set of bidirectional synchronization rules, where the synchronization rule describes a method of resolving the mismatch, where the synchronization rule comprises a reference to the first source element; and where the new corrective action comprises changing the synchronization rule as a function of a procedure described by the synchronization rule.

16. The computer program product of claim 15, where:

the synchronization rule further comprises a reference to a second source element of the source production data; and the new corrective action further comprises automatically loading the second source element as a function of the procedure described by the synchronization rule.

17. The computer program product of claim 15, where the new corrective action further comprises identifying the synchronization rule as a function of the first source element by means of a cross-reference that associates each rule of the set of bidirectional synchronization rules with at least one source element of the source production data.

18. A computer system comprising a processor, a memory coupled to said processor, and a computer-readable hardware storage device coupled to said processor, said storage device containing program code configured to be run by said processor via the memory to implement a method for automatically updating synchronization rules of a bidirectional database-synchronization system, the method comprising:

the processor loading a first source element of source production data comprised by a source database-management system and a first target element of target production data comprised by a target database-management system, where the source database-management system stores data in a first format that is distinct from a second format in which the target database-management system stores data, where the first source element and the first target element represent a same element of information;

the processor identifying a mismatch between the first source element and the first target element, where the mismatch creates an inconsistency between the source production data and the target production data, and where the mismatch has occurred because a user has performed a transaction that has altered the first source element and the first target element in an inconsistent manner;

the processor determining, using text-based cognitive analytics performed by a first artificially intelligent analytics engine, that the mismatch is of a certain type of a plurality of types of mismatches, where the certain type has not previously been corrected by any previously known corrective action;

the processor attempting to further determine, using semantic analytics performed by a second artificially intelligent analytics engine, a new corrective action, where the semantic analytics predicts that the new corrective action corrects mismatches of the certain type; and the processor updating the bidirectional database-synchronization system as a function of the determining, such that the bidirectional database-synchronization system becomes capable of identifying and correcting future mismatches of the certain type.

19. The system of claim 18, where the processor performs the loading in response to a user's revision of the first source element, where the recording further comprises:

the processor recording the results of the identifying and the attempting in a repository of known resolutions;

the processor recognizing, as a function of additional text-based analytics performed by the analytics engine, a pattern comprised by the cause of the mismatch;

the processor revising the analytics engine as a function of the pattern; and the processor recording the results of the identifying, the determining, the attempting, and the updating in the repository of known resolutions.

20. The system of claim 18, where the attempting further comprises:

the processor identifying a new corrective action that does resolve the mismatch;

where the bidirectional database-synchronization system comprises a synchronization rule of a set of bidirectional synchronization rules, where the synchronization rule describes a method of resolving the mismatch, where the synchronization rule comprises a reference to the first source element; and where the new corrective action comprises changing the synchronization rule as a function of a procedure described by the synchronization rule.

* * * * *